United States Patent
Anagnos

(10) Patent No.: US 11,744,679 B1
(45) Date of Patent: Sep. 5, 2023

(54) ORTHODONTICS COVER

(71) Applicant: Constandina Anagnos, La Grange Park, IL (US)

(72) Inventor: Constandina Anagnos, La Grange Park, IL (US)

(73) Assignee: Constandina Anagnos, La Grange Park, IL (US)

( * ) Notice: Subject to any disclaimer, the term of this patent is extended or adjusted under 35 U.S.C. 154(b) by 0 days.

(21) Appl. No.: 18/309,824

(22) Filed: Apr. 30, 2023

(51) Int. Cl.
*A61C 7/12* (2006.01)

(52) U.S. Cl.
CPC .................................. *A61C 7/125* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,512,740 A * | 4/1985 | Kurz | ...................... | A61C 7/125 433/22 |
| 4,913,654 A * | 4/1990 | Morgan | ................. | A61C 7/125 433/11 |
| 5,037,296 A * | 8/1991 | Karwoski | ................ | A61C 7/00 433/22 |
| 5,954,500 A * | 9/1999 | Spriggs | ..................... | A61C 7/00 433/22 |
| 7,530,355 B2 | 5/2009 | Berghash | | |
| 7,713,057 B2 * | 5/2010 | de Salazar Vinas | ..... | A61C 7/12 433/17 |
| 8,539,955 B2 * | 9/2013 | Foster | .................... | A61C 7/125 128/861 |
| 8,936,026 B2 * | 1/2015 | Hannapel | ................ | A61C 7/125 128/859 |
| 2010/0081106 A1 * | 4/2010 | Park | ........................ | A61C 7/125 433/8 |
| 2013/0196281 A1 * | 8/2013 | Thornton | ............. | A61C 19/063 433/8 |

* cited by examiner

*Primary Examiner* — Ralph A Lewis

(57) ABSTRACT

An orthodontics cover shields a patient's mouth from orthodontic appliances. The orthodontics cover comprises an arched shaped strip that has a protective outer perimeter to shield the patient's mouth. The strip has an inner perimeter having a longitudinally extending channel. The channel is formed on the inner perimeter of the strip, between opposed longitudinal ends. The channel covers the exterior surface of the patient's orthodontics appliances, such as braces or wires. The opposed longitudinal ends of the strip have lateral side flanges that cover an end portion of the patient's orthodontics appliances, such as the end of an orthodontics wire, to prevent engagement with the patient's mouth.

20 Claims, 4 Drawing Sheets

ORTHODONTICS COVER

A. BACKGROUND

The present invention relates to the field of orthodontics. Specifically, the invention relates to an orthodontics cover that protects a patient's mouth from irritation or injury due to contact with orthodontics appliances.

Orthodontic appliances such as braces, wires, springs, plastic braces (Invisalign™), cement brackets, rubber bands, tension adjusters, and tie rods "orthodontics" are used to correct dental irregularities. However, these appliances may cause discomfort, irritation, or injury to the soft tissue, cheeks, gums, teeth, or tongue of the patient's mouth. This discomfort may be especially severe during the first few days after the orthodontic appliances are placed or adjusted. Patients, especially children, may have a hard time adapting to orthodontics and may be less compliant with the treatment if the appliances cause too much discomfort.

Currently mouth guards such as those described in U.S. Pat. Nos. 7,530,355, and 8,936,026, 5,954,500, are incorporated by reference in their entirety and are geared towards sports. However these devices are large, uncomfortable and ineffective for protecting a patient's mouth from all the "orthodontics" and the individual components.

Conventional mouth guards are made from ethylene vinyl acetate (EVA), which is a pliable thermoplastic. EVA's softening point is less than the temperature of boiling water. Therefore, such a mouth guard may be formed, or custom fit, to the wearer's mouth by placing the mouth guard in hot water until it becomes soft, and then placing it in the wearer's mouth. Such a mouth guard retains the shape of the wearer's teeth and mouth upon cooling. Conventional dental appliances may be made of medical grade silicone, or other high temperature materials that cannot be heated or boiled for fitting around the teeth and gums. One example is disclosed in U.S. Pat. No. 5,954,500 (Spriggs). Because such traditional dental appliances cannot be molded, they tend to move around in the mouth, making it difficult to breathe and speak.

Therefore, there is a need for an improved orthodontics cover that protects the patient's mouth from the contact with the orthodontic appliances.

B. BRIEF DESCRIPTION OF THE DRAWINGS

Other objects and advantages of the invention may become apparent upon reading the detailed description and upon reference to the accompanying drawings.

C. DETAILED DESCRIPTION

An orthodontics cover shields a patient's mouth from orthodontic appliances. The orthodontics cover comprises an arched shaped strip that has a protective outer perimeter to shield the patient's mouth. The strip has an inner perimeter having a longitudinally extending channel. The channel is formed on the inner perimeter of the strip, between opposed longitudinal ends. The channel covers the exterior surface of the patient's orthodontics appliances, such as braces or wires. The opposed longitudinal ends of the strip have lateral side flanges that cover an end portion of the patient's orthodontics appliances, such as the end of an orthodontics wire, to prevent engagement with the patient's mouth.

Figure 1:
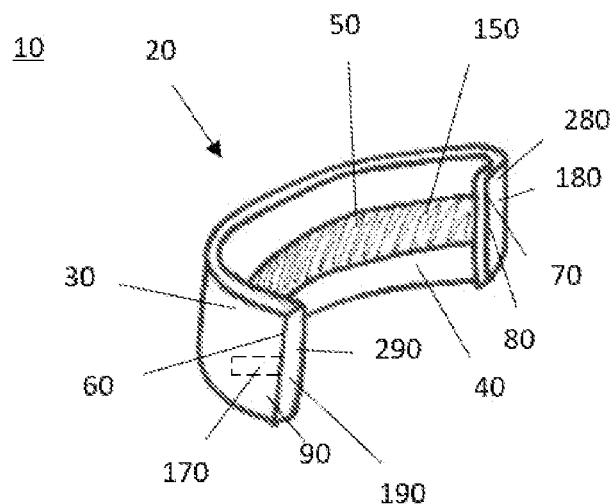
FIG. 1 is a perspective view of an orthodontics cover, an arched shaped strip for attachment to orthodontics, in accordance with some embodiments.
Figure 1:
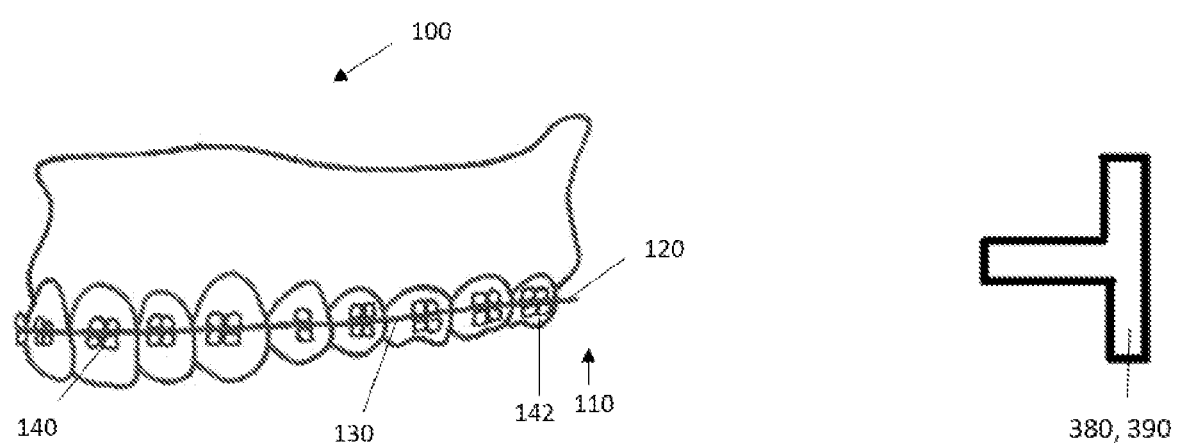

As shown in FIG. 1 an orthodontics cover 10 shields a patient's mouth from orthodontic appliances "patient's orthodontics 100". The orthodontics cover 10 comprises an arched shaped strip 20 that has a protective outer perimeter 30 to shield the patient's mouth. The strip 20 has an inner perimeter 30 having a longitudinally extending channel 50. The channel 50 is formed on the inner perimeter of the strip 30, between opposed longitudinal ends 60, 70. The channel 50 covers the exterior surface of the patient's orthodontics appliances 100, such as braces or wires. The opposed longitudinal ends 60, 70 of the strip 20 have lateral side flanges 80, 90 that cover an end portion 110 of the patient's orthodontics appliances, such as the end 120 of an orthodontics wire 130, to prevent engagement with the patient's mouth.

The orthodontics cover 10 may have grooves 150 on the channel 50 that attach to for example, snap to correspond to brackets 140, wire 120, 130 on the orthodontic appliance 100. The grooves 150 on the channel 50 may self-align when inserted onto the corresponding brackets 140, and/or wire 120, 130. Thus, the channel 50 may be sized and shaped to engage the brackets 140 and/or may engage the wire 120, 130. For example, the channel 50 may be sized and shaped to engage standard sized brackets 140 and/or may engage standard sized diameter and gauge of wire 120, 130.

Figure 4:
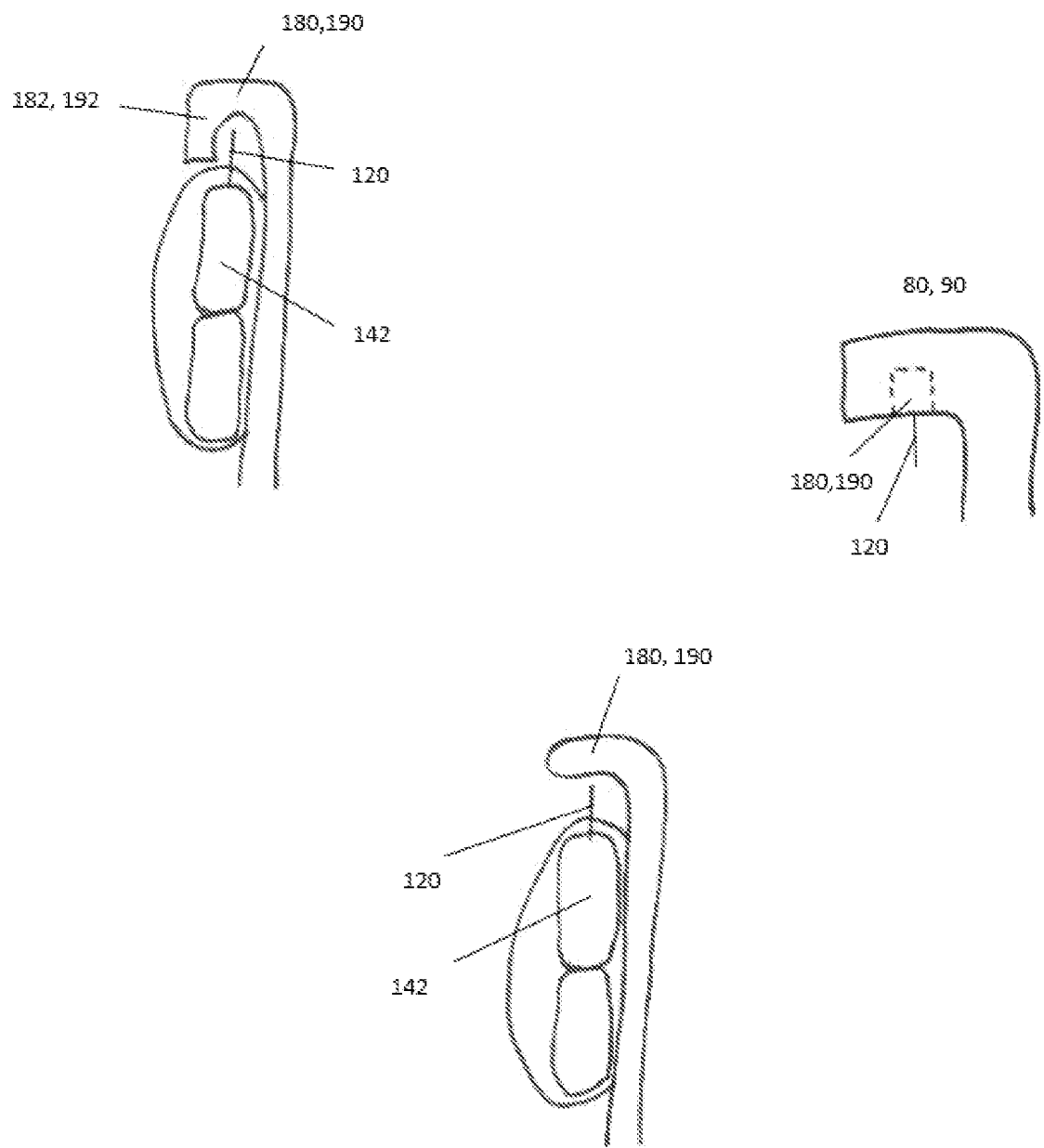
FIG. 4 is a top view of the lateral side flanges on the opposed longitudinal ends to cover an end portion of the patient's orthodontics, in accordance with some embodiments.

As shown in FIGS. 1 and 4, the side flanges 80, 90 may have a wire cap 180, 190 to releasably engage the end 120 of an orthodontics wire 130 and prevent engagement with the patient's mouth. For example, wire cap 180, 190 may prevent engagement with a patient's mouth such as the soft tissue, cheek, gums, tooth and other orthodontic components. The wire cap 180, 190 may further include a depression inside flanges 80, 90 to engage, attach, and or hold the wire 120. According to an alternative embodiment, the wire cap 180, 190 may be a separate component embedded into the flanges 80, 90 such as a domed cap 182, 192, 280, 290 suitable for durably engaging the wire end 120. Thus the wire cap 180, 190 may be made of a durable material such as rubber, plastic, stainless steel or other material suitable for engaging and containing the end 120 of the orthodontics wire 130. The wire cap 180, 190 may have a thickness greater than the length of the wire end 120 so that even if wire end 120 penetrates the wire cap 180, 190, the wire end 120 is shorter and will not poke out of the wire cap 180, 190 and will not poke the mouth. The wire cap 180, 190 can releasably engage the wire end 120 so that during fitting, the technician or orthodontic specialist can comfortably install the wire cap 180, 190 onto the wire end 120 and so the wire cap 180, 190 protects the patient's mouth. Further, the orthodontist may remove the wire cap 180, 190 from the wire end 120 after treatment and thus the wire cap 180, 190 such as a depression inside flanges 80,90 releasably engages the end 120 of an orthodontics wire 130 to prevent engagement with a patient's mouth.

Another problem to be solved during treatment is the lengthening of the wire end 120. For example, as teeth move during orthodontic treatment such as when the teeth are aligning, the distance between the teeth may be reduced, thus causing the wire 130 to slide along the brackets 140. Such movement of the wire 130 may result in the length of the end of wire 120 to increase. Again, this is typically caused by the bite lining up us such that the circumference of the bite is decreasing. However, since the total length of the wire 130 does not change, the ends of the wire 120 increase because the wire 130 slides past the last brackets 142 during these bite alignment treatments. As the teeth movement increases, as is common at the beginning of orthodontic treatment, and the teeth become more aligned, the wire 130 moves such that the ends of the wire 120 increase in length. The patient may not be aware of the ends of the wire 120 increasing in length until the ends of the wire 120 extend into the soft tissue of the users mouth, such as the check. Conventional treatment options may include applying wax to the wire end 120. Another option is requiring an orthodontist to cut the wire end 120 with wire cutters, however in an office visit that may take days to schedule unfortunately after the patient has already experienced painful wire end 120 puncturing soft tissue, such as the cheek.

According to one embodiment, the optional sliding of flanges 380, 390 may slide in and out of an optional slot 170 in the longitudinal ends 60, 70 to adjust to the size of the patient's orthodontics appliances and mouth. The slot 170 may have catches, a latch, a tether or any suitable mechanism to lock the optional sliding flanges 380, 390 to prevent side flanges 380, 390 from becoming loose or detaching from the strip 20. This avoids a choking hazard. Sliding the sliding flanges 380, 390 address or resolves the problem of increasing wire ends 120 described above. The orthodontist may adjust the sliding flanges 380, 390 to the current wire end 120 length and also to accommodate the expanding length of wire end 120 during treatment or at least until the next treatment appointment. Further, every stage of treatment and every tooth movement can be calculated such that the lengthening of the wire end 120 may be anticipated. As such, the suitable sliding flange 380, 390 design may be fitted to address current, and future wire end 120 length changes.

Figure 2:
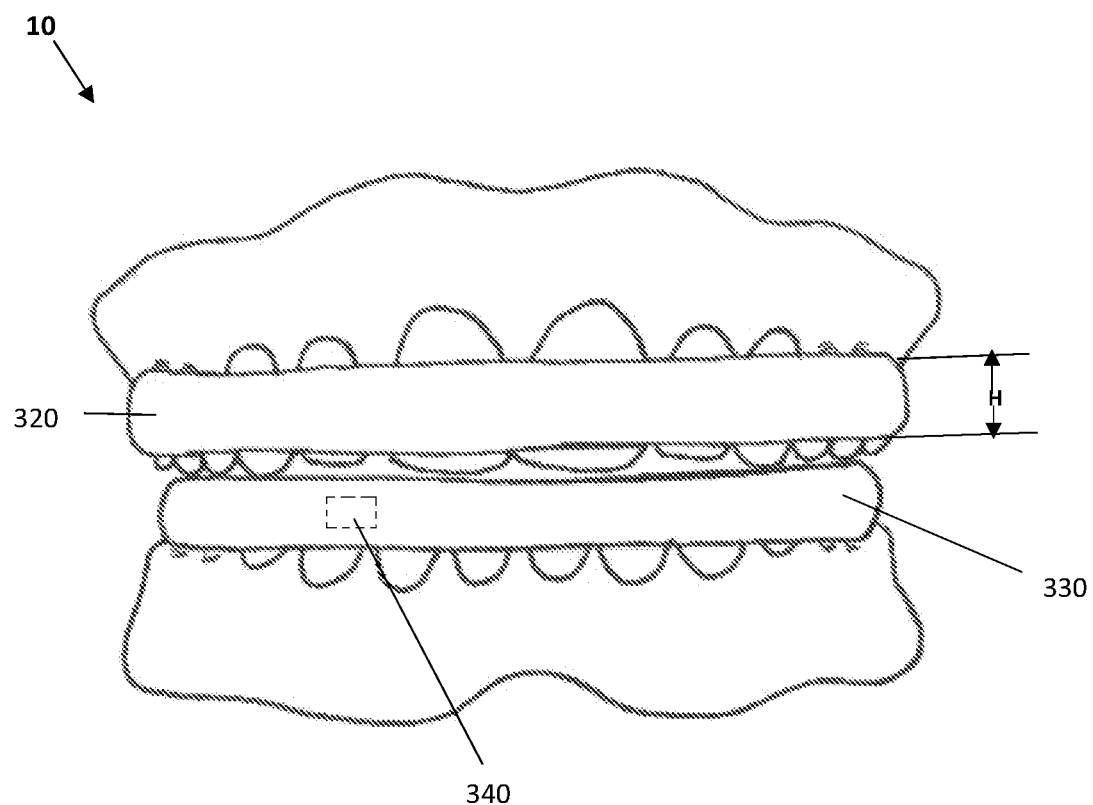
FIG. 2 is a front view of an upper strip and a lower strip attached to orthodontics in a patent's mouth, in accordance with some embodiments.
Figure 3:
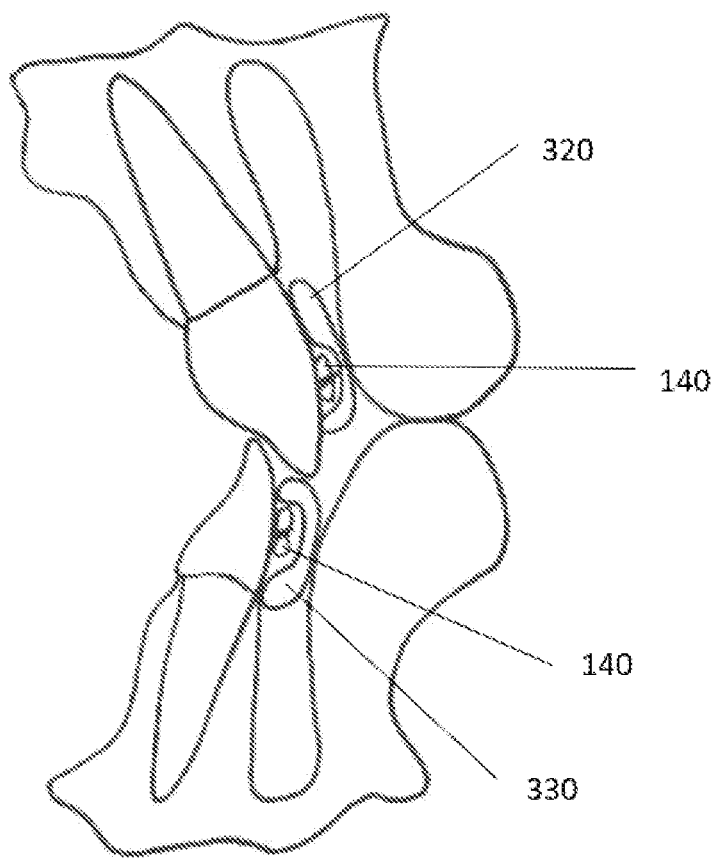
FIG. 3 is a cut away side view of FIG. 2, in accordance with some embodiments.

As shown in FIG. 2 the strip 20 may be an upper strip 320 to engage a set of upper orthodontics, and a lower orthodontics strip 330 to engage the lower set of orthodontics. The strip 20 may have cleaning holes 340 to allow removal of substances, such as food, from the orthodontics 100 and the strip 20. The cleaning hole(s) 340 may allow at least one of: pulsating water pressure, dental floss, a dental tool (toothpick), and air pressure to remove food from the orthodontics 100 and the strip 20.

The patient's orthodontics appliances 100 may comprise at least one of: metal braces, wires, springs, plastic braces (Invisalign™), cement brackets, rubber bands, tension adjusters, and tie rods. The strip 20, 320, 330 may be made of non-latex, rubber, plastic, stainless steel, and PVP or any suitable material. In one embodiment, as comfort may have a high priority, the strip 20, 320, 330 is sufficiently flexible to mold to the patient's orthodontics and thus may be made from a suitable rubber or rubber mixture or like material. As such, the strip 20, 320, 330 is sufficiently flexible to mold to the patient's orthodontics such as the brackets 140 and wire 120, 130.

The strip 20, 320, 330 may be made from EVA or a similar plastic having a low melting point (i.e. softenable in hot water). This allows part of the strip 20, 320, 330 to mold to the general shape of the teeth. The surface of the upper portion of the strip 20, 320, 330 that touches or comes in contact with the orthodontics 100 is made from a soft polymer such as PVC or KRATON Isoprene Rubber that cannot be formed or softened at the low temperatures at which EVA may be formed. This permits a custom fit without disturbing the user's braces. In addition, the molding of the guard on the lower portion of the teeth increases comfort and impact absorption. Further, the upper portion of the strip 20, 320, is sloped inward toward the user's teeth and gums to conform to the natural slope of the teeth and gums.

To improve aesthetics, the strip 20, 320, 330 may have at least one or more colors.

EVA or a similar low temperature melting plastic may be used. However, softer plastic could become entangled with the braces and cause damage or inconvenience such as shifting or pulling wires. Because every mouth has a different shape, a non-fitted strip 20 may not be suitable. Multiple molding of strip 20 may be used. For example, in U.S. Pat. No. 6,508,251 (Kittelsen), multiple layers of softenable/non-softenable material are disclosed. Moldable material include EVA, methyl methacrylete, chlorosulfonated polyethylene, fluoridated methacrylate, methacrylic acid or photo initiators. In U.S. patent application Ser. No. 10/232,240 (Publication No. 2003/0019497) (Farrell), a polyethylene "base member" is "encased" within EVA.

According to one embodiment as shown in FIG. 2, the orthodontics cover 20 has a height [H] sufficient to cover the patient's orthodontics 100. Since orthodontics 100 vary depending on the patient, the cover may be custom made in the desires height H, shape, width and with the suitable flange 180, 190 described above. For example, the height of the orthodontics [H] cover minimally covers the orthodontics 100 in order to be aesthetically pleasing. Thus, the orthodontics cover may only need to cover a portion, such as a right or left side, back molars, or any suitable combination or shape.

An orthodontist may perform a method of applying an orthodontics cover 10 to a patient's orthodontics. The orthodontist applies an arched shaped strip 20, 320, 330 having a protective outer perimeter 30 to a patient's mouth. The orthodontist applies a longitudinally extending channel 50 formed on an inner perimeter 30 of the strip 20 between the opposed longitudinal ends 60, 70 to cover the exterior surface of a patient's orthodontics 100. The orthodontist applies the lateral side flanges 80, 90 on the opposed longitudinal ends 60, 70 to cover an end portion 110 of the patient's orthodontics 100. The procedure may include in any order: Placing the side flanges 80, 90 to cover an end 120 of an orthodontics wire 130 to prevent engagement with a patient's mouth. Placing the side flanges 80, 90 having a wire cap 180, 190 to releasably engage the end 120 of an orthodontics wire 130 and prevent engagement with a patient's soft mouth tissue. Placing the side flanges 80, 90 slide in and out of a slot 170 in the longitudinal ends 60, 70 to adjust to a size of the patient's orthodontics 100 and mouth.

In summary, the present invention provides an orthodontics cover that shields the patient's mouth from the orthodontic appliances, thereby reducing discomfort and irritation to the patient.

The invention claimed is:

1. An orthodontics cover [10] comprising:
   an arched shaped strip [20] having a protective outer perimeter [30] to shield a patient's mouth;
   an inner perimeter [40] of the strip [20];
   a longitudinally extending channel [50] formed on the inner perimeter [30] of the strip [20] between opposed longitudinal ends [60, 70] to cover the exterior surface of a patient's orthodontics (100); and lateral side flanges [80, 90] on the opposed longitudinal ends [60, 70] to cover an end portion [110] of the patient's orthodontics [100].

2. The orthodontics cover of claim 1 wherein the side flanges [80, 90] cover an end [120] of an orthodontics wire [130] to prevent engagement with a patient's mouth.

3. The orthodontics cover of claim 2 wherein the side flanges [80, 90] have a wire cap [180, 190] to releasably engage the end [120] of an orthodontics wire [130] and prevent engagement with a patient's mouth.

4. The orthodontics cover of claim 2 wherein the side flanges [80, 90] slide in and out of a slot [170] in the longitudinal ends [60, 70] to adjust to a size of the patient's orthodontics [100] and mouth.

5. The orthodontics cover of claim 1 wherein the channel [50] has grooves [150] corresponding to brackets [140] on the orthodontics [100] to releasably engage the strip [20] from the brackets [140].

6. The orthodontics cover of claim 5 wherein the grooves [150] on the channel [50] correspond to standard sized orthodontics brackets [120].

7. The orthodontics cover of claim 5 wherein the grooves [150] on the channel [50] self-align when inserted onto the corresponding brackets [120].

8. The orthodontics cover of claim 1 wherein the strip [20] is an upper strip [320] to engage a set of upper orthodontics and further including a lower orthodontics strip [330] to engage lower set of orthodontics.

9. The orthodontics cover of claim 1 wherein the strip [20] further includes cleaning holes [340] to allow removal of substances from the orthodontics [100] and the strip [20].

10. The orthodontics cover of claim 9 wherein the cleaning holes [340] allow at least one of: pulsating water pressure, dental floss, a dental tool and air pressure to remove food from the orthodontics [100] and the strip [20].

11. The orthodontics cover of claim 1 wherein the patient's orthodontics [100] comprises at least one of: metal braces, wires, springs, plastic braces, cement brackets, rubber bands, tension adjusters and tie rods.

12. The orthodontics cover of claim 1 wherein the height of the orthodontics cover [H] is sufficient to cover the patient's orthodontics [100].

13. The orthodontics cover of claim 1 wherein the height of the orthodontics [H] cover minimally covers the orthodontics [100] in order to be aesthetically pleasing.

14. The orthodontics cover of claim 1 wherein the strip [20, 320, 330] comprises at least one of: non-latex, rubber, plastic, stainless steel, and PVP.

15. The orthodontics cover of claim 1 wherein the strip [20, 320, 330] is sufficiently flexible to mold to the patient's orthodontics.

16. The orthodontics cover of claim 1 wherein the strip [20, 320, 330] has at least one or more colors.

17. A method of applying an orthodontics cover [10] to a patient's orthodontics comprising:

applying an arched shaped strip [20, 320, 330] having a protective outer perimeter [30] to a patient's mouth;

applying a longitudinally extending channel [50] formed on an inner perimeter [30] of the strip [20] between the opposed longitudinal ends [60, 70] to cover the exterior surface of a patient's orthodontics (100); and applying lateral side flanges [80, 90] on the opposed longitudinal ends [60, 70] to cover an end portion [110] of the patient's orthodontics [100].

18. The method of claim 17 further including placing the side flanges [80, 90] to cover an end [120] of an orthodontics wire [130] to prevent engagement with a patient's mouth.

19. The method of claim 18 further including placing the side flanges [80, 90] having a wire cap [180, 190] to releasably engage the end [120] of an orthodontics wire [130] and prevent engagement with a patient's soft mouth tissue.

20. The method of claim 18 further including placing the side flanges [80, 90] slide in and out of a slot [170] in the longitudinal ends [60, 70] to adjust to a size of the patient's orthodontics [100] and mouth.

\* \* \* \* \*